United States Patent [19]

Kamody

[11] 4,275,044
[45] Jun. 23, 1981

[54] SULFUR DIOXIDE DISPOSAL SYSTEM

[75] Inventor: John F. Kamody, Irwin, Pa.

[73] Assignee: Koppers Company, Inc., Pittsburgh, Pa.

[21] Appl. No.: 973,395

[22] Filed: Dec. 26, 1978

Related U.S. Application Data

[63] Continuation-in-part of Ser. No. 806,541, Jun. 14, 1977, abandoned, which is a continuation-in-part of Ser. No. 660,058, Feb. 23, 1976, abandoned, which is a continuation-in-part of Ser. No. 531,064, Dec. 9, 1974, abandoned.

[51] Int. Cl.$^3$ .................... C01B 17/00; C01B 31/00; C01B 17/02; C01B 1/13
[52] U.S. Cl. .................................... 423/242; 423/244; 423/563; 423/569; 423/574 G; 423/415 A; 423/650
[58] Field of Search .......... 423/242 A, 244 A, 244 R, 423/242 R, 574 G, 56, 569, 572, 563, 415 A, 644, 650

[56] References Cited

U.S. PATENT DOCUMENTS

| | | | |
|---|---|---|---|
| 3,752,877 | 8/1973 | Beavon | 423/244 |
| 4,041,130 | 8/1977 | Mackles | 423/244 |
| 4,082,519 | 4/1978 | Steiner | 48/202 |

Primary Examiner—O. R. Vertiz
Assistant Examiner—Gregory A. Heller
Attorney, Agent, or Firm—Donald M. MacKay; Herbert J. Zeh, Jr.

[57] ABSTRACT

There is disclosed a multi-stage process for reducing sulfur dioxide to sulfur or to hydrogen sulfide whereby a hydrogen-containing gas from a high temperature gasifier is used. In the first stage of the process, the gasifier exit gas is contacted at a minimum temperature of about 1800° F. with recycle gas containing $SO_2$, $H_2S$, COS, mercaptans, and $CS_2$ in order primarily to reduce the organic sulfur compounds, i.e., COS, mercaptans, and $CS_2$, which heretofore would tend to accumulate in prior known methods employing a carbonaceous fuel for the reduction of $SO_2$. Gas leaving the first stage is then sent to a second stage wherein $SO_2$ from an external source is added. Reduction of sulfur dioxide occurs in the second stage at a temperature of about 2000° F. minimum, with the surplus heat of reaction removed by the generation of steam. Gas leaves the second stage and is thereafter cooled with simultaneous generation of steam and selective condensation of sulfur vapor. After cleaning and compression, the residual sulfur compounds contained in the gas may be removed and may then be returned to the first stage of the process or else introduced to a known sulfur recovery process. The disclosed process can permit the production of a useful gas without the need for preheating reactants or supplemental steam generation. In addition, the release of sulfur compounds to the atmosphere is eliminated or reduced in an economical manner. A minimal amount of process steam is used on an overall basis, thereby minimizing the problems associated in prior methods with condensation of sulfur vapor or treatment of aqueous effluents.

16 Claims, 2 Drawing Figures

SULFUR DIOXIDE DISPOSAL SYSTEM

CROSS-REFERENCE TO RELATED APPLICATIONS

This application is a continuation-in-part of application Ser. No. 806,541 filed June 14, 1977 (now abandoned), which was a continuation-in-part of application Ser. No. 660,058 filed Feb. 23, 1976 (now abandoned), which was a continuation-in-part of application Ser. No. 531,064 filed Dec. 9, 1974, and now abandoned. su

BACKGROUND OF THE INVENTION

Increasing concern over pollution of the atmosphere by $SO_2$ has led to the development of numerous $SO_2$ removal processes as would be applied, for example, to the recovery of $SO_2$ from the flue gas of fossil fuel power plants or to recovery of $SO_2$ from the off-gas of ore smelters. The various $SO_2$ removal processes are characterized as non-regenerable or regenerable processes. In non-regenerable processes the $SO_2$ is converted irreversibly to a fixed salt which must be disposed or sold as a by-product. Examples of non-regenerable processes include limestone scrubbing, where the $SO_2$ is converted to gypsum, or processes such as taught by Tatterson in U.S. Pat. No. 3,798,308 where ammonia, if available, is reacted with the $SO_2$ to form ammonium sulfite. Regenerable processes, on the other hand, can recover a concentrated $SO_2$ stream. An example of a regenerable $SO_2$ removal process is the Wellman-Lord process. The $SO_2$ so recovered is then converted to saleable sulfuric acid or else must be converted to elemental sulfur. Carbonaceous fuels including coal have been suggested as an energy source for the reduction of $SO_2$ to sulfur in regenerable $SO_2$ systems.

The concept of using coal as an agent for the removal or reduction of $SO_2$ dates back to at least the year 1879. As concern increased over the atmospheric pollution caused by $SO_2$, progress was made on improvement of the basic teachings involved with the use of carbon or coal as an $SO_2$ reducing agent. The earliest extensive demonstration of using coal for the reduction of $SO_2$ is believed to have occurred in the 1930's when the Consolidated Mining and Smelting Company of Canada, Ltd., of Trail, British Columbia, operated a so-called "sulfur producer" whereby $SO_2$ recovered from a smelting operation was introduced to a coal-fed, fixed-bed gas producer. Within the gas producer the carbon in the coal directly reduced the $SO_2$ to sulfur vapor which in turn was condensed to give a solid elemental sulfur product. A discussion of data obtained at the Trail, British Columbia, plant was made by Robert Lepsoe in *Industrial and Engineering Chemistry*, Vol. 32, No. 7, pages 910-918, July 1940. In more recent times, additional but conceptually similar teachings have been made on the use of coal or hot char as an $SO_2$ reducing agent. Kertamus et al., in *Hydrogen Processing*, February 1974, pages 95-96, suggested that sulfur dioxide be used in lieu of oxygen as a gasification agent for coal to produce carbon monoxide by feeding concentrated $SO_2$ along with hot char to produce carbon monoxide and sulfur, along with carbonyl sulfide. In the process of Kertamus et al., the sulfur vapors so produced would then be condensed and then separately burned to $SO_2$, with the $SO_2$ then separated from the relatively inert combustion products so that concentrated $SO_2$ could then be recycled for the gasification of additional quantities of hot char.

The most recent disclosures on the use of coal for reduction of $SO_2$ are believed to be those which relate to the development of the Foster Wheeler RESOX ™ process. Here, an external source of $SO_2$ would be reacted with coal at a moderate temperature of typically 1400° F. in the presence of substantial surplus of steam in order to reduce the $SO_2$ to sulfur vapor or to hydrogen sulfide. Sulfur vapor would be condensed from the effluent gas to yield a solid sulfur product. Hydrogen sulfide would be recovered from the gas whereupon it could be reduced to sulfur by reduction with additional quantities of $SO_2$, such as in the well-known Claus process. A description of the Foster Wheeler RESOX ™ process can be found in the May-August 1974 issue of *Heat Engineering*, which is a Foster Wheeler corporate publication. Further description of the process can be found in patents assigned to Foster Wheeler Energy Corporation, and include U.S. Pat. No. 4,082,519, British Pat. No. 1,390,694 and French Pat. No. 2,195,584. The novel teachings of these patents which distinguish them from the prior work done at Trail, British Columbia, relate to using sufficient steam to permit a relatively low gasification temperature of 1200°-1400° F.

Reducing agents for $SO_2$ include carbon, carbon monoxide, hydrogen, hydrogen sulfide, and carbonyl sulfide. The reduction reactions and associated standard heats of reactions (kcal/gram mole of $SO_2$) are as follows, with a negative sign indicating an exothermic reaction.

Carbon Reduction:

$$C + SO_2 = CO_2 + \tfrac{1}{2}S_2(-7.60) \qquad \text{(Eqn. 1)}$$

and $$2C + SO_2 = CO + \tfrac{1}{2}S_2(+16.81) \qquad \text{(Eqn. 2)}$$

Carbon Monoxide Reduction:

$$3CO + SO_2 = COS + 2CO_2(-71.75) \qquad \text{(Eqn. 3)}$$

Hydrogen Reduction:

$$3H_2 + SO_2 = H_2S + 2H_2O(-49.43) \qquad \text{(Eqn. 4)}$$

and $$2H_2S + SO_2 = \tfrac{1}{2}S_2 + 2H_2O(-29.15) \qquad \text{(Eqn. 5)}$$

Hydrogen Sulfide Reduction (Basic Claus Reaction):

$$2H_2 + SO_2 = 2H_2O + 3/2S_2(+11.41) \qquad \text{(Eqn. 6)}$$

Carbonyl Sulfide Reduction:

$$2COS + SO_2 = 2CO_2 + 3/2S_2(-2.97) \qquad \text{(Eqn. 7)}$$

The above reactions along with additional reactions can occur simultaneously and thus represent a complex system, where performance depends on initial concentration of reactants, temperature, pressures, and rate of reaction. However, several points are important for an understanding of the present invention.

(1) The most rapid and effective reduction of $SO_2$ generally occurs with hydrogen.

(2) The reduction of $SO_2$ with CO or COS is, generally speaking, very slow and usually demands catalytic inducement when conducted at temperatures considerably lower than about 1600° F.

(3) None of the reduction reactions can be effected to 100% completion without complete removal of reaction products.

(4) All of the reactions which produce CO or $H_2$, both of which are useful as gasification products or as reducing agents for $SO_2$, demand an input of heat. Equation 2, for example, requires a heat input of 16.81 kcal/g-mole of $SO_2$. Additional CO or $H_2$ generation reactions which can occur in a coal gasification system are as follows:

$$C + H_2O = CO + H_2 \tag{Eqn. 8}$$

and $$C + CO_2 = 2CO \tag{Eqn. 9}$$

The above reactions require heat inputs of 31.38 and 41.22 kcal/g-mole of carbon, respectively. An exception is when free oxygen is also present in the system, in which case, for example, heat equal to 26.42 kcal/g-mole of carbon is liberated by the following reaction:

$$C + \tfrac{1}{2}O_2 = CO \tag{Eqn. 10}$$

Prior known methods for the reduction of $SO_2$ using carbonaceous fuels have a number of limitations which the invention disclosed herein overcomes.

First of all, the prior known methods are not well suited for the production of CO and/or $H_2$, which are useful by-products of $SO_2$ reducing agents, with $H_2$ being an excellent reducing agent. This is because the heat associated in the generation of CO and $H_2$, as well as the heat associated in raising the reactants to the specified temperature, is barely provided, if at all, by reacting in-situ all of the generated CO and $H_2$ with $SO_2$, exothermically, thereby leaving little or no CO or $H_2$ as a by-product. For example, in the teachings of the previously mentioned patents assigned to Foster Wheeler Energy Corporation the numerous independent reactions which occur to form $H_2S$ from $SO_2$ may be summed together to represent either of the following two overall idealized net reactions:

$$C + \tfrac{4}{3}H_2O + 2/3 SO_2 = CO_2 + 2/3 H_2S \tag{Eqn. 11}$$

heat of reaction = 11.4 kcal/g-mole or $$C + \tfrac{1}{3}H_2O + \tfrac{1}{3}SO_2 = CO + \tfrac{1}{3}H_2S \tag{Eqn. 12}$$

heat of reaction + 14.9 kcal/g-mole

It is to be noted from the above reactions that production of useful CO is accomplished only with an input of heat. Heat is liberated only if the carbon in the coal is converted to $CO_2$ (a non-useful gas). The heat so generated in the formation of $CO_2$ in accordance with Eqn. 11 is just sufficient to increase the temperature of reactant products to about 1400° F. Heat losses can significantly reduce the maximum temperature achieved in prior known $SO_2$ reduction methods. In British Pat. No. 1,390,694, it was necessary, for example, to preheat reactants in the pilot unit for the process. Additional heat must be supplied externally to generate steam used in the process. To evaporate one mole of water to form steam requires 10.52 kcal/g-mole of steam. Although only one mole of water per mole of $SO_2$ is theoretically required in accordance with Eqn. 11, prior known methods have taught that a considerable surplus of steam is required for providing sufficient driving force for the reaction. Steiner, in U.S. Pat. No. 4,082,519, teaches that steam should be preferably added to the gasifier in admixture with $SO_2$, with the $SO_2$ concentration preferably being 8–10 vol. %, or about 9 moles of steam per mole of $SO_2$. Evaporating water to generate this quantity of steam would require an external heat input of 94.67 kcal/g-mole of $SO_2$ fed to the gasifier. At 100% heat transfer efficiency, approximately the full heat of combustion of an additional mole of carbon would be required. Therefore, at least twice as much carbon would be consumed overall than is indicated by Eqn. 11.

Preheating reactants or generation of steam is very inefficient, with the latter being exceptionally inefficient since the latent heat of vaporization is irreversibly lost in the overall process in accordance with the second law of thermodynamics. Therefore, it is preferable to use a minimal amount of steam in the $SO_2$ reduction process. The disclosed invention does use a minimal amount of steam by incorporating a high temperature oxygen blown gasifier in the overall process. With the use of oxygen there is no problem in generation of CO and/or $H_2$ and in supplying necessary heat directly to the process and maintaining a high temperature since heat is rapidly generated by highly exothermic oxidation of carbon to CO (Eqn. 10) or to $CO_2$ as shown below:

$$C + O_2 = CO_2 \tag{Eqn. 13}$$

The addition of oxygen to a gasification process is by no means novel, but the use of free oxygen is expressly taught against in most prior art teachings of employing a gasification process adapted for the reduction of $SO_2$. The reason for teaching against the use of free oxygen is that when $SO_2$ is reduced to sulfur the oxygen originally present in the $SO_2$ must somewhere in the process combine with carbon, thereby seemingly dictating a higher overall carbon usage when free oxygen is used as a gasifying agent. However, it is a finding that prior art teachings would demand more carbon combustion for external supply of heat, for example, to generate steam, than the additional carbon which would be consumed in the gasifier per se whenever oxygen is used as a gasification agent in accordance with the disclosed invention.

Using a minimal amount of steam, as is a feature of the disclosed invention, offers additional advantages over prior art teachings. For example, when sulfur vapors are generated by the reduction of $SO_2$ it is necessary, of course, to condense these sulfur vapors as well as to condense the water vapor which accompanies the gas. It is preferable, however, to avoid simultaneously condensing sulfur and water since this leads to plugging of equipment and highly corrosive conditions. In the Claus sulfur recovery process, for example, the removal of water vapor by its condensation from the tailgas would be theoretically beneficial in extending the degree of overall sulfur necessary in the Claus process, which presently is thermodynamically limited at about 93–95%. A number of serious attempts have been made to eliminate water in the Claus process, but all have been unsuccessful. This problem is recited by Beavon in *Chemical Engineering*, Dec. 13, 1971, pages 70–73. In prior known gasification processes for reduction of $SO_2$, the high usage of steam can result in an exit gas where some water can condense from the gas simultaneously with the sulfur even though there is a big difference in boiling points between sulfur and water. With the disclosed invention, the minimal steam usage results in a gas which ordinarily contains less than 30 vol. % water and no more than about 10 vol. % of diatomic sulfur vapor. Over the range of anticipated operating pressures of the disclosed process it is possible to condense nearly 100% of the sulfur vapor from the gas before any water vapor begins to condense, thereby minimizing corrosion and operating problems.

An additional advantage to the use of a minimal amount of steam would be a reduction in the quantity of aqueous effluents to be treated. Generally the water condensed from the gas cannot practically be evaporated again for recycle to the gasifier because of contamination of this condensate, especially with sulfur compounds. Therefore this condensate must be treated to acceptable limits for discharge to a waterway. This problem is particularly serious for prior art $SO_2$ reduction methods which stressed the use of low temperatures for gasification of the coal, such as in Steiner U.S. Pat. No. 4,082,519, where 1200°–1450° F. is the preferred temperature. At such temperature tars, phenols, and other environmentally hazardous compounds are evolved from the volatile matter of the coal and are subsequently condensed along with water. Thus in the prior methods of $SO_2$ reduction, due consideration must be given as to whether the usefulness of the prior methods in regard to abating air pollution is offset by contributions to increased water pollution. In the disclosed invention a minimal amount of aqueous effluent would be generated and, in addition, no tars, phenols, or other condensible hydrocarbons are generated due to the high gasification temperature employed. It is recognized by those skilled in the art that gasification temperatures of at least 1800°–2000° F. are necessary to pyrolyze any condensible hydrocarbons generated from coal. Steiner, on the other hand, in Column 2, lines 49–54 of U.S. Pat. No. 4,082,519, expressly teaches against the use of high temperature.

A final major distinction between the disclosed invention and all of the prior teachings is that in all of the prior methods the reduction of $SO_2$ occurs directly in the gasifier, whereas the disclosed invention teaches the reduction of $SO_2$ externally to the gasifier. This is done in the disclosed invention in order to overcome certain disadvantages which are not obvious from the prior teachings. First of all, when $SO_2$ is intimately contacted with carbon within a gasifier most of the $SO_2$ can be reduced to sulfur, but, unfortunately, in the presence of steam some sulfuric or sulfurous acid can form, particularly at low temperature. As an example, in the Westvaco carbon absorption process for removal of $SO_2$ from flue gas, as reported in *The Oil and Gas Journal* for Sept. 11, 1978, on page 90, carbon is intentionally used to absorb $SO_2$ as sulfuric acid which can then be regenerated. It is of course resonable to expect that not all of the sulfuric acid can be regenerated and, if so, a portion of it should be regenerated to form sulfur trioxide. An additional reason for not introducing $SO_2$ directly to the gasifier of the disclosed invention is that free oxygen could otherwise oxidize some of the $SO_2$ to $SO_3$. Steiner in U.S. Pat. No. 4,082,519, as well as Kertamus, teach the combustion of recycled sulfur compounds to $SO_2$ prior to introduction to the gasifier. Here, an additional opportunity exists for the formation of $SO_3$. Although $SO_3$ would be generated only in minor quantities, it is significant to note that only minor quantities of $SO_3$ can affect the dewpoint of the gas generated and can furthermore result in formation of dilute sulfuric acid in the sulfur recovery system of prior processes. Unlike many inorganic acids, sulfuric acid is extremely corrosive when in dilute, not concentrated form.

An additional disadvantage to adding $SO_2$ directly to the gasifier is that organic sulfur compounds such as COS, $CS_2$, and traces of mercaptans, are easily formed in view of the fact that the sulfur is intimately contacted with carbon. In addition, low temperature operation encourages such formation. Once formed, these organic sulfur compounds are not easily reduced since, as previously mentioned, they are slow to react. Hydrogen is effective in reducing these organic sulfur compounds, particularly at high temperature, but as previously discussed, hydrogen is not easily generated in prior practices because of heat deficiencies. In British Pat. No. 1,390,364, as shown in Example 1, COS in the raw gas accounted for up to 14% of the sulfur fed to the gasifier, while $CS_2$ accounted for up to about 6% of the sulfur fed to the gasifier. Similar levels of organic sulfur were observed in the aforementioned operations in Trail, British Columbia. In the Kertamus et al. article previously cited, COS was present at up to 47.0 vol. % in the product gas. Although it might first appear that organic sulfur compounds could be recovered from the effluent gas for recycle to the gasifier, that is not believed to be practical since the low temperature and low level of hydrogen in prior processes would not adequately serve to reduce these compounds to more acceptable forms, particularly in the presence of additional coal charged to the gasifier.

With today's increasingly stringent regulations on discharge of sulfur compounds to the atmosphere, the presence of the organic sulfur compounds characteristically produced by coal gasification is presenting serious problems. First of all, these organic sulfur compounds are difficult or expensive to remove from the raw gas by known acid gas removal systems. Separation is enhanced by first catalytically hydrolyzing these compounds to $H_2S$, which is much easier to remove. Catalytic processing, however, can be expensive and often impractical. Known sulfur recovery processes additionally have great difficulty in removal of organic sulfur compounds, and in many cases organic sulfur compounds may additionally be formed in some sulfur recovery processes. In the case of the well-known Claus process as reported by Beavon in the aforementioned *Chemical Engineering* article, COS and $CS_2$ which form in the Claus reaction furnace are slow to react to form sulfur over the Claus catalyst. Typically 0.25–2.5% of the input sulfur to the Claus process passes untouched in these forms into the Claus tailgas. As of August 1978, at least ten commercially available processes were available for treatment of Claus tailgas to extend sulfur recovery. These processes are characteristically expensive and concentrate on methods, usually catalytic, for reducing organic sulfur compounds to sulfur or to hydrogen sulfide. Claus tailgas is characteristically very lean in sulfur compounds, with over 90% of the gas comprised of nitrogen, carbon dioxide, and water vapor. Typically, within Claus tailgas, organic sulfur compounds account for about 17% of the total sulfur present in said tailgas, with the balance of sulfur compounds being $S_2$, $SO_2$, and $H_2S$. Recycling of tailgas to the Claus furnace is sometimes practiced, for example, as taught by Hujsak et al. in U.S. Pat. No. 3,681,024, but it is essential to note that even with recycling the net generation of tailgas (stream 60, for example, in the patent of Hujsak et al.) is unavoidable in the Claus process since nitrogen contained in the air charged to the Claus furnace and water formed from $H_2S$ must somewhere leave the process, and with the tailgas some sulfur compounds are unavoidably lost or must be further treated. Recycling tailgas to the gasifiers employed in prior teachings is believed to be impractical since, as previously mentioned, there would be difficulties in reduction of organic sulfur and, in addition, the nitrogen and $CO_2$ present in the tailgas would represent a tremendous heat drain to the gasifiers used in prior practices which already are difficult to maintain in thermal balance.

Aside from the Claus process other well-known sulfur recovery processes are available. Examples are the Stretford and Thylox processes, where sulfur is formed by an oxidation-reduction coupling reaction from $H_2S$ which is absorbed from the raw gas. The practical use of such processes has heretofore been restricted by the fact that organic sulfur compounds such as COS cannot be reduced to sulfur by such sulfur recovery systems.

The invention disclosed herein offers a practical and economical scheme for reducing $SO_2$ while still being able to keep organic sulfur compounds from accumulating in the system. This is accomplished by use of a two-stage concept, the features of which will be discussed herein.

SUMMARY OF THE INVENTION

In the broadest scope of the invention, carbonaceous fuel, oxygen, and steam are fed, preferably by entrainment, to a known gasifier which operates at a temperature of preferably at least 2000° F. to yield a raw gas rich in hydrogen and carbon monoxide, along with a residue ash by-product. The novel features of the invention relate to the use of the raw gas for effecting the reduction of $SO_2$ without an intolerable buildup of organic sulfur compounds or release of sulfur compounds to the atmosphere.

The raw gas enters the first stage of the disclosed process where a recycle gas containing typically 2-3 volume percent of sulfur compounds, including $SO_2$, $S_2$, COS, $CS_2$, $H_2S$, and traces of mercaptans is introduced. Within this first stage these sulfur compounds are converted nearly completely to $S_2$ and $H_2S$. Nitrogen, carbon dioxide, and water vapor contained in the recycle gas serve to cool the gas within the first stage to about 1800° F., thereby coincidentally freezing any molten ash particles which might be entrained in the raw gas exiting the gasifier.

Gas leaves the first stage of the process and then enters a second stage wherein $SO_2$, or an $SO_2$-rich gas, from an external source is added. The $SO_2$ then reacts to form diatomic and some monoatomic sulfur vapor, along with $H_2S$ and small quantities of COS and traces of $CS_2$ and mercaptans. Heat generated by the reaction of $SO_2$ with hydrogen heats the gas to at least 2000° F. and excess heat is removed preferably by the indirect generation of steam along with simultaneous condensation of a portion of the sulfur vapors.

Gas leaves the second stage and enters a heat recovery unit, such as a waste heat boiler, whereby the gas is cooled to a temperature greater than 340° F., but yet above the temperature at which water vapor begins to condense from the gas. Sulfur condensed from the second stage is combined with sulfur condensed from the heat recovery unit and then frozen for disposal or by-product use.

Gas from the second stage is essentially free of sulfur vapor and is then scrubbed of remaining particulates and cooled, with simultaneous condensation of water vapor. Sulfur compounds present in the cleaned gas may then be removed leaving behind a sulfur-free by-product gas containing CO and $H_2$, with the sulfur compounds so removed then sent to a sulfur recovery unit, such as the well-known Claus or Stretford processes, for recovery of additional sulfur. Tailgas from the sulfur recovery plant is then sent to the first stage of the process. As an alternative, the known sulfur recovery process can be eliminated and the cleaned gas would instead be treated for removal of $CO_2$, with the $CO_2$-free gas then sent to the first stage of the invention.

For a further understanding of the invention and for features and advantages thereof, reference may be made to the following description and drawings which illustrate preferred embodiments of equipment in accordance with the invention.

DETAILED DESCRIPTION

Figure 1:
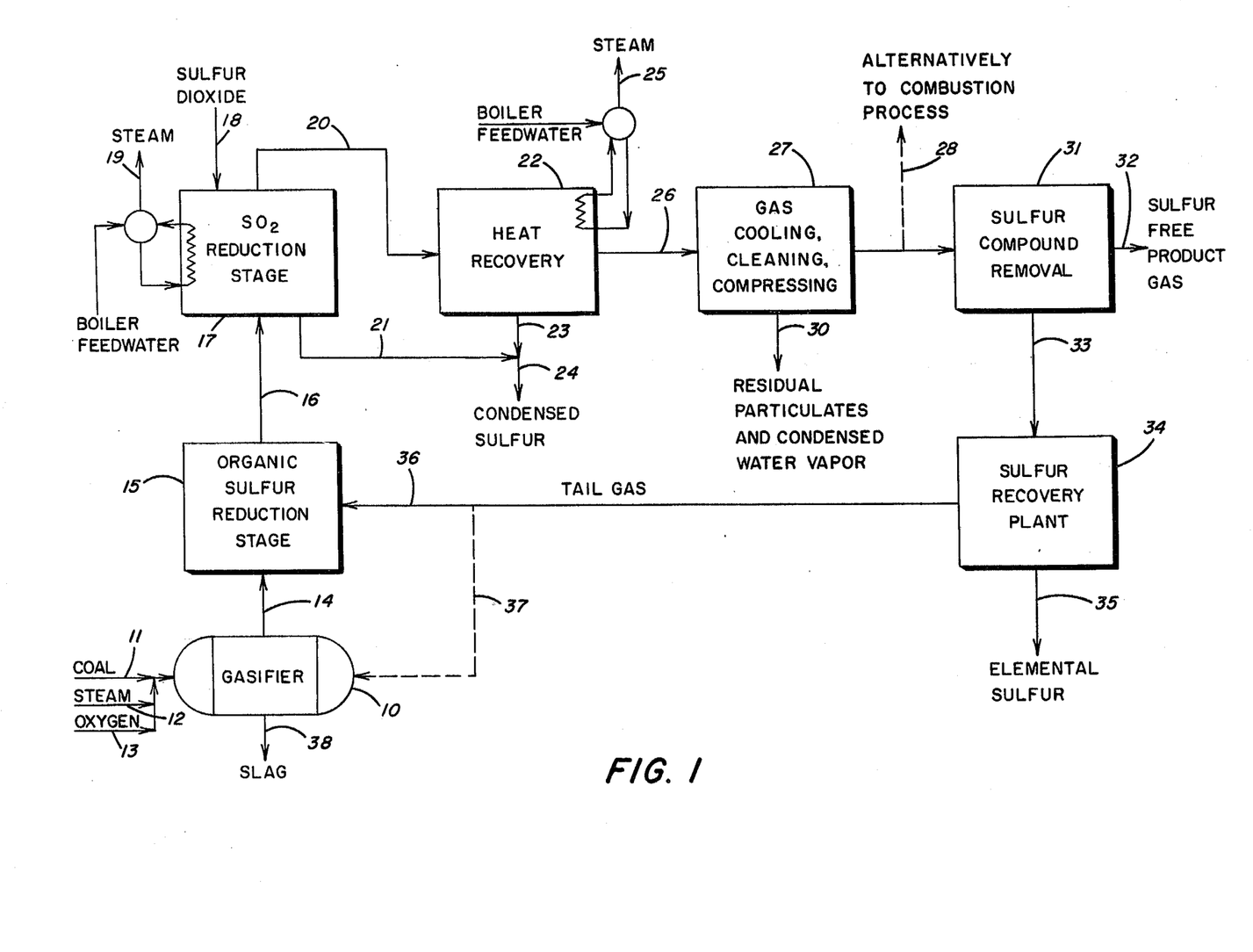
FIG. 1 illustrates a simplified flow diagram which represents a preferred embodiment of the invention to be employed whenever the $SO_2$ added from an external source ranges up to about 50 pounds per million Btu of net calorific heat content of the carbonaceous fuel charged to the gasifier.

Referring to the flow diagram of FIG. 1, a known high temperature gasifier (10), for example, the Koppers-Totzek gasifier as typically described in U.S. Pat. No. 2,702,743, is supplied with a carbonaceous fuel such as coal (11) in a pulverized form, steam (12), and oxygen (13). The carbonaceous fuel can encompass all grades of coal, coke, petroleum coke, char, heavy residuals, oil, or pumpable slurries of carbonaceous materials. The coal may be entrained with steam and oxygen into the gasifier, as with the Koppers-Totzek process, or alternatively the steam can be replaced with water which serves to slurry the coal for feeding of the gasifier, as in the well-known Texaco coal gasification process.

The carbonaceous fuel is partially combusted in the gasifier by known methods to produce a gas (14) rich in carbon monoxide and hydrogen. Gasification may occur at absolute pressures ranging from one atmosphere to about 50 atmospheres. Gas (14) leaves the gasifier with 20-50 volume percent hydrogen, at a temperature of at least 2000° F. to a maximum of about 3500° F.

Steam and oxygen addition to the gasifier is regulated to ensure that a maximum amount of the carbon contained in the carbonaceous fuel is completely gasified. Molten slag (38) may be recovered from the bottom of the gasifier and a portion of remaining ash and small amounts of ungasified fuel can be entrained with the gas (14) leaving the gasifier.

In the case of gasifying a high sulfur content Illinois coal by means of the known Koppers-Totzek process, the gasification of 991 pounds of such coal would typically require 842 pounds of 98 vol. % purity oxygen and 364 pounds of steam to yield 100 moles of raw gas (14) having the following typical analysis:

|     | Volume % |
| --- | --- |
| CO | 49.80 |
| $CO_2$ | 7.11 |
| $H_2$ | 29.94 |
| $N_2$ + Ar | 0.74 |
| $H_2S$ | 0.88 |
| COS | 0.06 |
| $H_2O$ | 11.13 |
| $SO_2$ | 0.00 |
| $NH_3$ + HCN | 0.34 |
| Total | 100.00 |

Following the flow diagram of FIG. 1, the raw gas above then enters a non-catalyzed organic sulfur reduction stage (15) where a recycle gas (36) having the following typical composition is introduced:

|     | Volume % |
| --- | --- |
| $H_2$ | 2.5 |
| CO | 1.0 |
| $CO_2$ | 10.0 |
| $N_2$ | 56.2 |
| $H_2O$ | 26.0 |
| $S_2$ | 0.7 |
| $H_2S$ | 2.0 |
| $SO_2$ | 1.0 |
| COS | 0.3 |
| $CS_2$ | 0.3 |
| Total | 100.0 |

The above composition is representative of using a multi-stage Claus process (34) elsewhere in the overall process. If a different sulfur recovery process is employed, the composition of the recycle gas will be different from the one given above. Nitrogen contained in the above gas can be kept at only 1-3 volume percent if pure oxygen rather than air is used for firing of the Claus furnace (34). Alternatively, nitrogen could be essentially deleted from the recycle Claus tailgas (36) by employing only catalytic stages within the Claus process. A feature of the invention is that the sulfur recovery process (34) used elsewhere in the overall process need not be a Claus unit but, instead, may be a direct sulfur recovery process, such as the Stretford process, which is incapable of removing organic sulfur compound such as COS and, as such, was heretofore restricted in its practical use for prior known sulfur recovery processes.

Organic sulfur compounds are present to varying degrees within any coal gasification process and include COS, $CS_2$, and at times various mercaptan compounds such as methyl mercaptan. These compounds are easily reduced at high temperature with hydrogen and are also reduced with water vapor, although water vapor is less effective as a reducing agent than hydrogen. To prevent the accumulation of organic sulfur compounds it is necessary that their net reduction equate to the rate of their net formation while preferably minimizing their steady-stage concentrations. This has been found to be best accomplished in accordance with the invention by employing the organic sulfur reduction stage (15) previously described. The reason for this is that the organic sulfur compounds are most concentrated with the recycle gas stream (36) introduced to the stage, while simultaneously the maximum hydrogen concentration is apparent in the raw gas (14) leaving the gasifier.

Within the organic sulfur reduction stage (15) each of the organic sulfur compounds introduced with the recycle gas is reduced typically at an extent of 70 to nearly 100 percent by means primarily of the following reactions:

$$COS + H_2O = CO_2 + H_2S \qquad \text{(Eqn. 14)}$$

$$COS + H_2 = CO + H_2S \qquad \text{(Eqn. 15)}$$

$$CS_2 + H_2O = CO + 2H_2S \qquad \text{(Eqn. 16)}$$

$$CS_2 + 2H_2 = C + 2H_2S \qquad \text{(Eqn. 17)}$$

Any sulfur dioxide contained in the recycle gas (36) is predominantly converted to $H_2S$ by means of Eqn. 4. The reduction reactions occurring within this stage (15) are most exothermic, but there is a net tendency to instead cool the gas to typically 1800°-2000° F. due to the sensible heat of the $CO_2$, $N_2$, and $H_2O$ predominantly present in the recycle gas. This cooling effect freezes any molten slag particles which might be entrained with the hot gas (14) leaving the gasifier. Freezing of slag particles is useful in avoiding adhesion of slag to equipment surfaces elsewhere in the process.

As shown on FIG. 1, a portion of the recycle gas (37) might, but not ordinarily, be introduced directly to the gasifier (10) as a means of moderating gasifier temperature. In addition, the water vapor in this gas (37) may serve to replace some or all of the steam (12) ordinarily fed to the gasifier. When the tailgas (37) is added to the gasifier it is preferred that it be introduced away from the immediate vicinity of the flame zone so as not to directly contact carbon before the carbon is gasified with the oxygen (13) and steam (12), thereby avoiding additional formation of organic sulfur compounds.

Gas (16) leaves the organic sulfur reduction stage (15) and then enters the $SO_2$ reduction stage (17) as shown on FIG. 1. Here $SO_2$ (18), or an $SO_2$ mixture of at least about 50 volume % concentration, from an external process is introduced. Within this stage (17) the $SO_2$ is converted quite exothermically with hydrogen by means of Eqns. 4 and 5. In addition, the $H_2S$ present in the gas as would be produced, for example, by Eqn. 4, would reduce additional $SO_2$ to sulfur vapor in accordance with Eqn. 6. Some COS may form as by Eqn. 3, but relatively little COS would form to the slower reaction rate of CO. Any COS so formed would ultimately be recovered (31) and then reduced in the organic sulfur reduction stage (15). Some $CS_2$ and traces of mercaptans can also form, but would be formed at less than 50 ppm by volume. Like COS, the $CS_2$ and mercaptans would also be ultimately recovered (31) for reduction within the organic sulfur reduction stage (15) of the disclosed invention. Whenever the $SO_2$ added to the $SO_2$ reduction stage (17) is in a quantity of about 50 pounds per million Btu of net calorific content of coal used, the gas (20) leaving the $SO_2$ reduction stage (17) would have the following typical composition on a nitrogen and argon-free basis:

|     | Volume % | % of Total Sulfur in Gas |
| --- | --- | --- |
| CO | 37.66 | — |
| $CO_2$ | 18.21 | — |

-continued

| | Volume % | | % of Total Sulfur in Gas |
|---|---|---|---|
| $H_2$ | 15.18 | | — |
| $H_2S$ | 7.34 | | 67.53 |
| COS | 0.62 | | 5.70 |
| $H_2O$ | 19.52 | | — |
| $SO_2$ | 0.04 | | 0.37 |
| $S_2$ | 1.43 | | 26.31 |
| $CS_2$ | 0.00 | (50 ppm) | 0.09 |
| Total | 100.0 | | 100.00 |

Nitrogen content of the above gas would range from 1–10 volume percent, depending on the sulfur recovery process (34) selected later in the overall process. As can be seen above, over 90% of the sulfur in the exit gas (20) is converted to $H_2S$ plus $S_2$.

As $SO_2$ reacts within the $SO_2$ reduction stage (17), heat is generated in accordance with Eqns. 4 and 5. This heat serves to raise the gas temperature. Gas temperature is maintained at about 2000° F. by removing excess heat, as by the generation of steam (19). As steam is generated, a portion of the sulfur vapors condense and liquid sulfur (21) may be recovered at the bottom of the stage. This condensation of sulfur provides additional driving force for Eqns. 5 and 6 to proceed. As sulfur condenses on heat exchange surfaces, the heat exchange surfaces are protected by liquid sulfur from any high temperature gas phase corrosion.

Gas (20) leaves the $SO_2$ reduction stage (17) and then enters a heat recovery unit (22), for example, a waste heat boiler, where additional steam (25) is generated as the gas is cooled. Nearly 100% of the remaining sulfur vapor condenses as the gas is cooled and the condensed sulfur (23) flows out of the heat recovery unit (22). Gas (26) leaving the heat recovery unit is yet above the temperature, i.e., dewpoint, at which water vapor would begin to condense, thereby avoiding plugging or corrosion problems. It is preferred that the gas (26) not be cooled to less than 340° F., nor that water used for this steam generation be introduced to the heat exchange surfaces at less than 340° F. This is because liquid sulfur displays the anomalous property of having a sharp viscosity increase in the vicinity of 340° F. Above 340° F. the liquid sulfur is sufficiently fluid to permit recovery while simultaneously avoiding buildup of sulfur on heat exchange surfaces.

Sulfur (24) recovered from both the $SO_2$ reduction stage (17) and the the heat recovery unit (22) can be contaminated with particulates which are entrained with the gas leaving the gasifier. In the usual application of the invention this is expected to be of little consequence, since the primary intent of the process is to dispose of sulfur contained in $SO_2$, and forming frozen elemental sulfur is well recognized as the most environmentally acceptable method. If the sulfur (24) is to be sold it may be purified, for example, by dissolving it in a solvent such as carbon disulfide, filtering out the particulates and evaporating and recycling the solvent. In many ways the accumulation of particulates upon the liquid sulfur surface can be beneficial, for example, this reduces the quantity of residual particulates which must be scrubbed from the gas later in the process.

Gas (26) leaves the heat recovery unit (22) and then enters a system (27) whereby residual entrained particulates are scrubbed from the gas, for example, by the use of recirculating water through one or more venturi scrubbers. As the particulates are scrubbed from the gas, the gas is simultaneously cooled and water (30) is consequently condensed from the gas. Gas may then be compressed, if necessary.

Following the step (27) comprising cooling, cleaning, and compressing, the gas (29) is then treated by known methods (31) for the removal of sulfur compounds to thereby yield a sulfur-containing gas (33) as well as sulfur-free gas (32) which is valued as a by-product for its content of CO and $H_2$ which were unconverted in the overall process of the invention. As an alternative to the step (31) comprising the removal of sulfur compounds, FIG. 1 shows that all or a portion (28) of the sulfur-containing gas leaving the particulate removal system (27) may be sent to an external process, for example, a combustion process, where $SO_2$ generated upon combustion could be recovered by a regenerable $SO_2$ removal process, with the $SO_2$ so removed then sent to the $SO_2$ reduction stage (17) of the disclosed invention.

The sulfur-containing gas (33) from the sulfur removal step would ordinarily contain up to about 70 percent of the sulfur so added from the $SO_2$ charged to the $SO_2$ reduction stage (17). This sulfur-containing gas (33) would be sent to a known sulfur recovery process (34), such as the Claus process or the Stretford process, where most of this sulfur contained in the feed is converted to elemental form (35). All known sulfur recovery processes (34) are incapable of removing 100 percent of the sulfur fed to said process. Degree of sulfur recovery would typically range from 70–95 percent within the sulfur recovery unit, depending on the type of process selected or on optimal economic considerations.

Current environmental restrictions usually prevent discharge of the 5–30 percent unconverted sulfur contained in the effluent gas (36) of the selected sulfur recovery process (34), even when this tailgas is first incinerated before discharge to the atmosphere. It is therefore necessary to treat this tailgas (36) for removal of contained sulfur. As an alternative to the known tailgas treatment units, this disclosed invention teaches that it would be more practical to instead feed the tailgas (36) to the organic sulfur reduction stage (15) as shown on FIG. 1. The two-stage concept of this disclosed invention offers superior advantages in recycling of the gas, since prior known methods employing gasifiers for the reduction of $SO_2$ are not well suited for accommodating organic sulfur compounds which are characteristically heavily concentrated in the tailgas (36) of a sulfur recovery unit.

The process of FIG. 1 results in essentially 100 percent overall conversion of sulfur from the carbonaceous fuel plus external $SO_2$ (18) to elemental form. Additionally, a minimal amount of steam (12) is used to result in a minimal amount of overall water (30) which is condensed from the process, and this condensed water is free of tars and other carcenogenic hydrocarbons. In addition, any vent gases to the atmosphere are eliminated. Such vent gases are encountered, for example, with known alternate processes employed for the treatment of sulfur-containing gases. In addition, a sulfur-free gas (32) is produced which contains $CO_2$ produced by the overall reduction of $SO_2$ as well as surplus $H_2$ and CO which are valuable.

Figure 2:
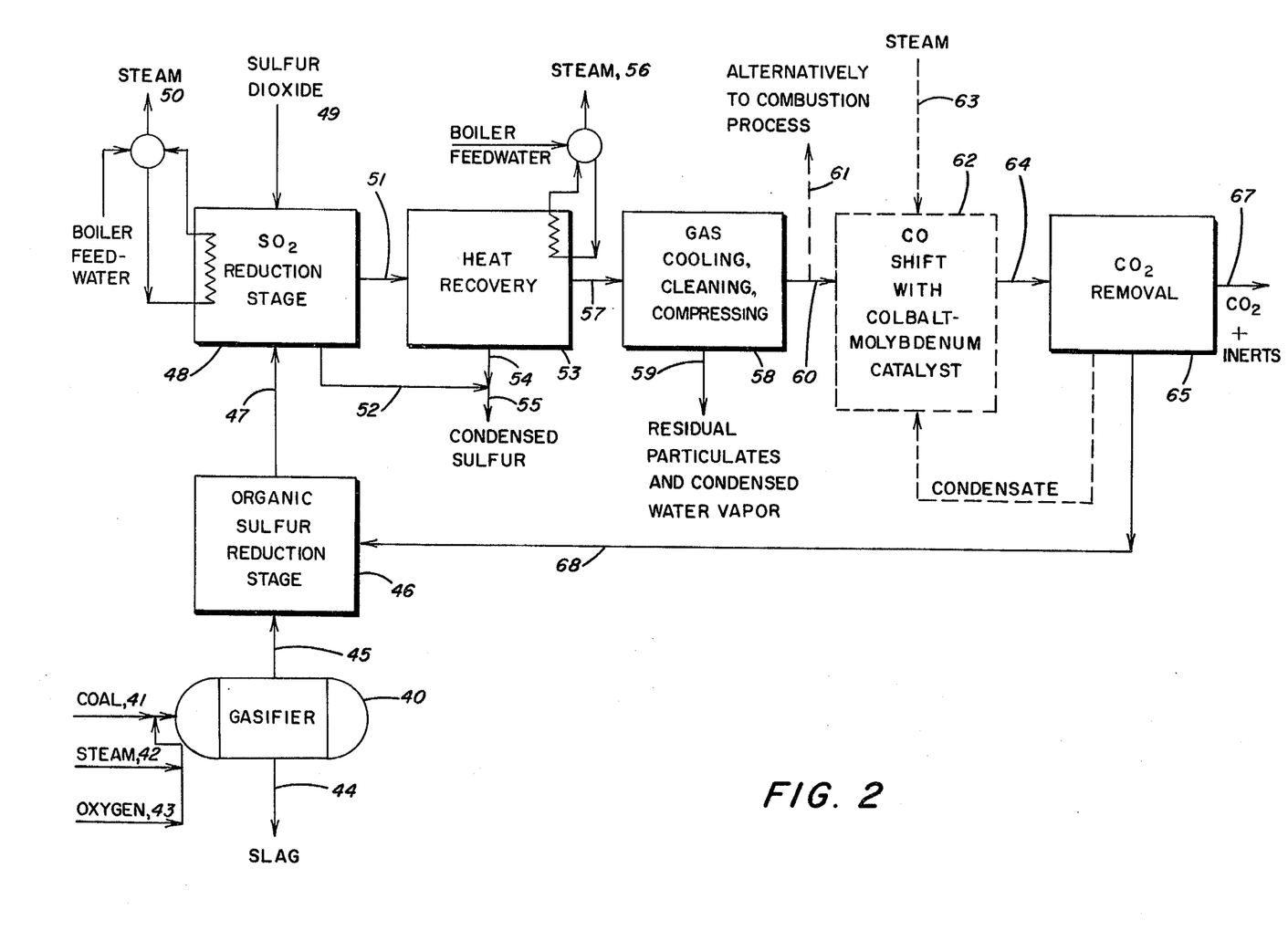
FIG. 2 illustrates a simplified flow diagram which represents a preferred embodiment of the invention to be employed whenever the $SO_2$ added from an external source ranges from about 50 pounds to about 150 pounds per million Btu of net calorific heat content of the carbonaceous fuel charged to the gasifier.

In the event that $SO_2$ available from an external source ranges between 50 to about 150 pounds per million Btu of net calorific heat content of the carbonaceous fuel to be gasified, the simplified flow diagram depicted by FIG. 2 would be preferred for practice of the invention. The major distinction between the flow diagram of FIG. 2 versus FIG. 1 is that in FIG. 2 the known sulfur recovery process (34) of FIG. 1, for example, the Claus or Stretford process, is eliminated. The reason for this is that when the $SO_2$ to be reduced is relatively high, a per-pass reduction of up to about 75 percent of the $SO_2$ to elemental sulfur is possible within the $SO_2$ reduction stage (48). By a careful consideration to the gas processing steps it is possible to prepare a sulfur-containing gas which would be more practically reduced within the organic sulfur reduction stage (46) of the invention rather than in a known sulfur recovery process to thereby still achieve an overall sulfur recovery of essentially 100 percent while simultaneously avoiding the cost and associated energy input of a sulfur recovery unit.

When $SO_2$ addition (19) to the $SO_2$ reduction stage (48) equates to about 150 pounds per million Btu of net calorific heat content of the carbonaceous fuel used, gas (51) would exit this stage with the following representative composition:

|  | Volume % |  | % of Total Sulfur in Gas |
|---|---|---|---|
| CO | 14.17 |  | — |
| $CO_2$ | 35.20 |  | — |
| $H_2$ | 4.21 |  | — |
| $N_2$ + Argon | 0.75 |  | — |
| $H_2S$ | 5.20 |  | 19.42 |
| COS | 0.60 |  | 1.27 |
| $H_2O$ | 27.76 |  | — |
| $SO_2$ | 2.82 |  | 5.59 |
| $S_2$ | 9.29 |  | 73.72 |
| $CS_2$ | 0.00 | (23 ppm) | 0.00 |
| Total | 100.00 |  | 100.00 |

After recovery of heat (53) and selective condensation of sulfur vapor (54) the gas (57) is cooled, cleaned, and compressed (58) along with simultaneous condensation of water (59). Remarks on these steps are the same as generally apply to the flow diagram depicted by FIG. 1.

The cleaned gas (60) shown on FIG. 2 is now sent ordinarily to a known process (65), such as the well-known Rectisol process, where $CO_2$ (67) generated on a net basis from the coal is selectively removed from the gas. This recovered $CO_2$ (67) would typically contain 0-20 ppm by volume of sulfur compounds, of which most would be $H_2S$. This quantity is within limits of current environmental regulations. The $CO_2$ removal process (65) can also be designed to recover inert compounds, in particular, nitrogen and argon which enter the process on a net basis.

After $CO_2$ is removed by the known $CO_2$ removal step (65) there is left over a gas (68) rich in sulfur compounds but which additionally contains a favorable amount of $H_2$ and CO. This $H_2$, in particular, enhances the extent of sulfur compounds reduction which is possible within the organic sulfur reduction stage (46) to which this gas would be recycled. The hydrogen contained in the recycle gas (68), like the hydrogen in the gasifier exit gas (45), is ultimately converted at steady-state conditions to water (59) which is condensed in the gas cooling and cleaning operation (58).

The CO in the gas recycled (68) to the organic sulfur reduction stage (46), like the CO present in the gasifier exit gas (45), is ideally converted to $CO_2$ on an overall steady-state basis, for example, by Eqn. 3, and additionally by the well-known water gas shift reaction, i.e., $$CO + H_2O = CO_2 + H_2 \qquad \text{(Eqn. 18)}$$

to thereby generate additional hydrogen. The water gas shift reaction (Eqn. 18) is somewhat exothermic and contributes to the heat input of the process. The extent of conversion of CO to $H_2$ by the water gas shift reaction is enhanced by the fact that the $H_2$ produced is consumed by the desirable reduction of $SO_2$ with $H_2$ in accordance with Eqns. 4 and 5.

Although the reactions involved with CO are acceptably rapid at the temperatures employed in practice of the invention, the CO reactions are still somewhat slower than those involving the consumption of hydrogen. Therefore, as shown on FIG. 2, it is possible to enhance performance of the overall process by employing, as an option, an additional processing step (62) comprising the use of a known sulfur-resistant CO shift catalyst. Here a sulfur-resistant CO shift catalyst, such as one composed of cobalt and molybdenum, is used to convert all or a portion of the CO contained in the cleaned gas (60) to hydrogen and carbon dioxide by reaction with steam (63) in accordance with Eqn. 18. Coincidentally with the CO shift reaction most of the $SO_2$ contained in the gas (60) would be reduced to $H_2S$, while a portion of the COS would also be hydrolyzed to $H_2S$. Following $CO_2$ removal (65), a gas (68) rich in hydrogen and $H_2S$ would be sent to the organic sulfur reduction stage (46) of the disclosed invention. Steam (63) would be added to the CO shift operation (62). This steam addition is minimized by employing appropriate gas humidification and dehumidification unit operations within the CO shift facilities (62).

Care must be taken in the process shown in FIG. 2 that inert compounds such as nitrogen and argon do not accumulate. Ordinarily these inert compounds would be removed along with $CO_2$ (67) in the $CO_2$ removal step (65). However, as with the case of FIG. 1, all or a portion (61) of the clean gas may be taken from the system after the gas cooling and cleaning operation (58) and thereafter sent to an external process, for example, a combustion process, with $SO_2$ so formed in said external process recovered by a regenerable $SO_2$ removal process, with the $SO_2$ so recovered then sent to the $SO_2$ reduction stage (48) of the disclosed invention. This bleed stream (61) so taken to an external process would beneficially serve to purge inert compounds such as nitrogen from the system.

I claim:

1. An improved process for reducing $SO_2$ using a carbonaceous fuel gasifier, comprising:
   (a) gasifying a carbonaceous fuel in a gasifier in the presence of steam and oxygen to produce a raw gas rich in $H_2$ and CO;
   (b) passing the raw gas from the gasifier at a temperature between 2000° F. and 3500° F. into an organic sulfur reducer along with recycle gas containing $SO_2$, $H_2S$, COS, $CS_2$ and mercaptans and maintaining sufficient residence time within the organic sulfur reducer to react the recycle gas with the raw gas, thereby reducing the COS, $CS_2$ and mercaptans in the recycle gas to predominantly $H_2S$ and $S_2$;
   (c) passing the raw gas and recycle gas mixture from the organic sulfur reducer into a $SO_2$ reducer and adding the $SO_2$ to be reduced to the $SO_2$ reducer;
   (d) maintaining the temperature and residence time within the $SO_2$ reducer to reduce the $SO_2$ to predominantly H₂S vapor along with unconverted SO₂ and lesser amounts of COS, CS₂ and mercaptans;

(e) treating the gas from the SO₂ reducer for selective condensation of sulfur vapor to produce a sulfur vapor-free gas at a minimum temperature of 340° F.; and (f) cooling and condensing water vapor from said sulfur vapor-free gas and then treating the said cooled gas for additional removal of remaining sulfurous gases, with said sulfurous gases recycled to said organic sulfur reduction stage;

(g) and recovering a sulfur free product gas rich in H₂ and CO.

2. The process of claim 1, wherein the gasifier so used operates at a minimum temperature of 2000° F. and pressures ranging from 1–50 atmospheres absolute.

3. The process of claim 1, wherein the organic sulfur reducer operates at a temperature of at least 1800° F.

4. The process of claim 1, wherein the SO₂ reducer operates at a temperature of about 2000° F.

5. The process of claim 1, whereby no sulfurous gases are ordinarily added directly to the gasifier.

6. The process of claim 1, wherein a portion of the recycle gas added to the organic sulfur reducer is added directly to the gasifier, as long as the portion of recycle gas added to the gasifier is not performed in admixture with any of the other gasifier feeds and as long as the recycle gas added to the gasifier does not directly contact the flame zone of said gasifier.

7. The process of claim 1, whereby the SO₂ reduced on an overall basis to elemental sulfur equates to as high as 150 pounds per million Btus of net calorific heat content of carbonaceous fuel added to said gasifier.

8. The process of claim 1, whereby the concentrated sulfurous gases produced in step (f) are first processed through a sulfur recovery process to thereby convert 70–95 percent of the sulfur contained in the concentrated sulfurous gases to elemental form, with the sulfurous gases unconverted to elemental form by the sulfur recovery process then returned to the said organic sulfur reduction stage of step (b) of claim 1.

9. The process of claim 8, whereby the sulfur recovery process is a Claus process.

10. The process of claim 8, whereby the sulfur recovery process is a Stretford process.

11. The process of claim 8, whereby the sulfur recovery process is a sulfur recovery process which does not remove organic sulfur compounds.

12. The process of claim 8, whereby the overall amount of SO₂ added to the SO₂ reducer equates to up to 50 pounds per million Btu of net calorific heat content of said carbonaceous fuel added to said gasifier.

13. The process of claim 1, wherein all or a portion of the cooled gas produced in accordance with step (f) is then sent to an external process, with the SO₂ generated by said external process recovered by a regenerable SO₂ removal process, with SO₂ recovered by the regenerable SO₂ removal process then sent to the SO₂ reducer.

14. The process of claim 1, whereby the cooled gas produced in accordance with step (f) is first treated in a CO shift reactor employing sulfur-resistant CO shift catalyst before the sulfurous gases contained in the gas are concentrated by subsequent removal from the cooled gas.

15. The process of claim 14, whereby the sulfurous gases leaving the CO shift reactor are concentrated by means of removing CO₂ from the gases leaving the CO shift reactor, with the CO₂-free gas which results then sent to the said organic sulfur reducer.

16. The process of claim 1, wherein said carbonaceous fuel is selected from the group comprised of coal, petroleum coke, char, heavy residuals, oil, or pumpable slurries of carbonaceous materials.

* * * * *